(12) United States Patent
Keller

(10) Patent No.: US 6,206,047 B1
(45) Date of Patent: Mar. 27, 2001

(54) FLOW DUCT FOR THE PASSAGE OF A TWO-PHASE FLOW

(75) Inventor: Jakob Keller, late of Wohlen (CH), by Maria Keller-Schärli, Vera Keller, Georg Keller, legal representatives

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/391,401

(22) Filed: Sep. 8, 1999

(30) Foreign Application Priority Data

Jun. 24, 1998 (EP) .................................................. 98810966

(51) Int. Cl.$^7$ .................................................. F15D 1/02
(52) U.S. Cl. .................. 138/39; 138/38; 138/45
(58) Field of Search ................ 138/38, 39, 43, 138/45, 46

(56) References Cited

U.S. PATENT DOCUMENTS

| | | | |
|---|---|---|---|
| 2,077,482 | | 4/1937 | Jones et al. . |
| 2,197,243 | * | 4/1940 | Moran ................................. 138/38 |
| 2,950,740 | * | 8/1960 | Bock ................................... 138/38 |
| 3,729,383 | * | 4/1973 | Goeldner ............................ 138/43 |
| 3,733,057 | * | 5/1973 | Kahoun ............................... 138/44 |
| 3,750,709 | * | 8/1973 | French ................................ 138/38 |
| 3,785,405 | * | 1/1974 | Quinn ................................. 138/39 |
| 4,190,105 | * | 2/1980 | Dankowski ......................... 138/38 |
| 4,574,643 | | 3/1986 | Scott et al. . |
| 4,690,211 | * | 9/1987 | Kuwahara et al. ................. 138/38 |
| 4,797,563 | | 1/1989 | Richardson . |
| 4,861,165 | * | 8/1989 | Fredriksson et al. .............. 138/44 |
| 4,881,596 | * | 11/1989 | Bergmann et al. ................. 138/38 |
| 5,092,366 | * | 3/1992 | Sakamoto ........................... 138/39 |
| 5,803,165 | | 9/1998 | Shikazono et al. . |
| 5,829,246 | * | 11/1998 | Abrams et al. .................... 138/43 |
| 5,833,389 | * | 11/1998 | Sirovich et al. ................... 138/39 |

FOREIGN PATENT DOCUMENTS

4443222 A1   6/1996   (DE) .

* cited by examiner

Primary Examiner—James Hook
(74) Attorney, Agent, or Firm—Burns, Doane, Swecker & Mathis, L.L.P

(57) ABSTRACT

A flow duct for the passage of a two-phase flow which has a liquid and a gaseous phase is described, comprising an inner wall completely enclosing the two-phase flow radially to the direction of flow. The invention is distinguished by the fact that raised contours are provided on the inner wall of the flow duct, and these raised contours are attached to the inner wall essentially perpendicularly to the direction of flow and are at a distance from one another in the direction of flow.

9 Claims, 1 Drawing Sheet b)

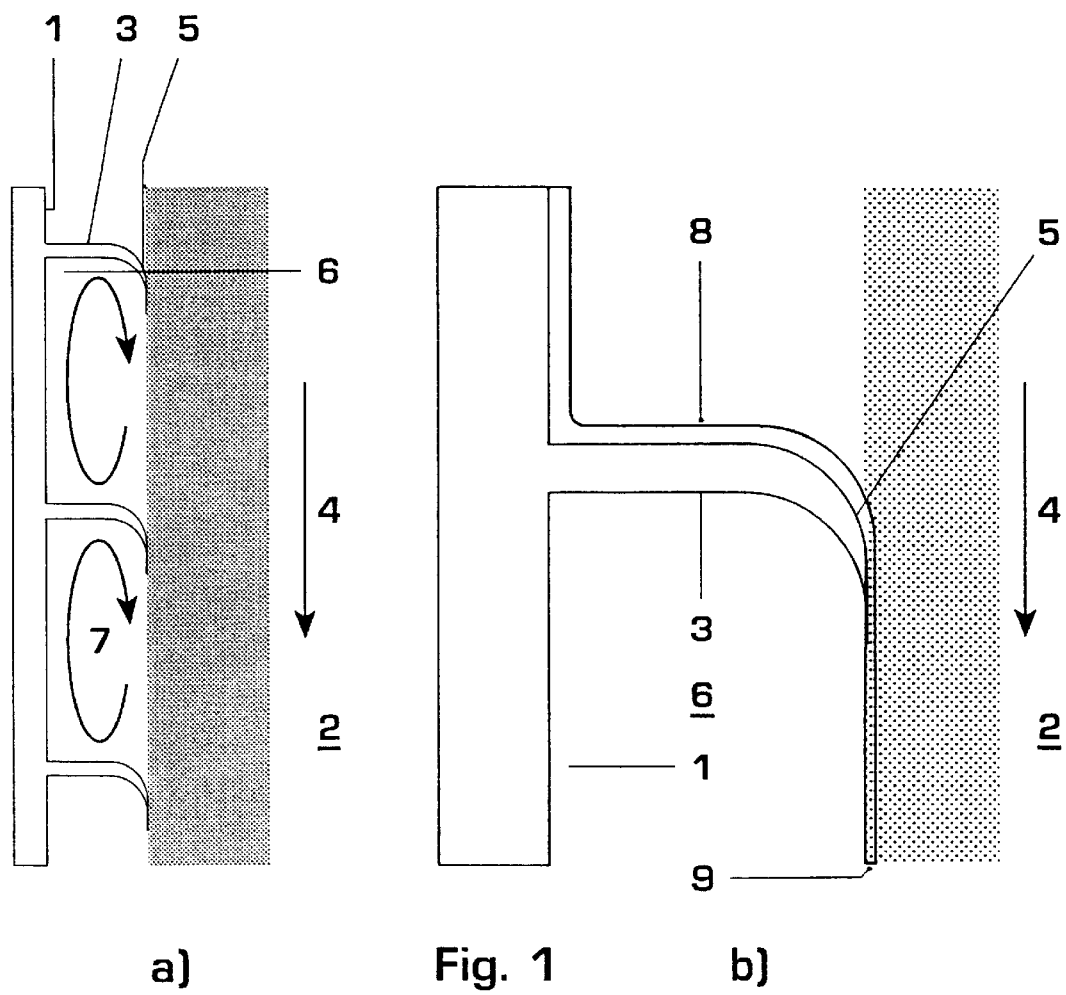
a) Fig. 1 b)
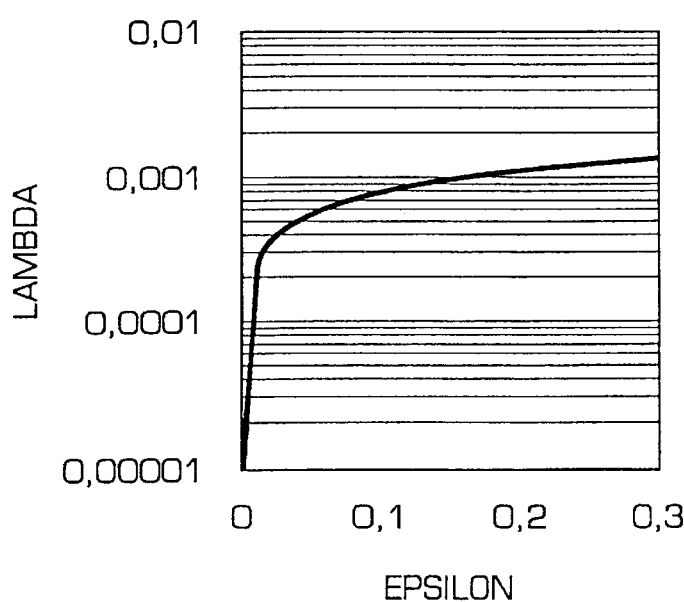
Fig. 2

FLOW DUCT FOR THE PASSAGE OF A TWO-PHASE FLOW

BACKGROUND OF THE INVENTION

1. Field of the Invention

The invention relates to a flow duct for the passage of a two-phase flow which has a liquid and a gaseous phase, comprising an inner wall completely enclosing the two-phase flow radially to the direction of flow.

2. Discussion of Background

Two-phase flows are mass flows which are composed of two different flows of substances, for example a mixture of a liquid and a gas. Such two-phase flows are important, for example, in the compression of air which is fed in compressed form to an energy-generating plant. Thus ideas are known which utilize the principle of isothermal compression for the supply of gas-turbine plants with precompressed air, as disclosed, for example, by US publication U.S. Pat No. 4,797,563.

In the case described above, an air/water mixture is accelerated along an incline and then directed into a pressure chamber. Further developments in this respect provide for the accelerated two-phase flow to be directed for the purposes of compression into a nozzle arrangement, for example into a Laval nozzle, within which kinetic energy is specifically extracted from the two-phase mixture, while at the same time the air contained in the mixture is compressed. It has been possible to show that the selection of the droplet size of the water drops contained in the water/air mixture has a decisive effect on the efficiency of the nozzle with regard to its compression characteristics.

However, more extensive investigations with regard to the flow-duct wall enclosing the two-phase flow have not been carried out so far. In particular, more accurate knowledge of the boundary-layer behavior between the two-phase flow and the flow-duct wall could in this case make a decisive contribution to improvements with regard to the avoidance of flow losses on account of friction as well as the occurrence of phase separations, as a result of which the efficiency of a flow duct, in particular of a two-phase Laval nozzle, could be considerably improved.

A few interesting aspects of the flow behavior of a two-phase flow through a flow duct may be gathered from the following contributions:

I. M. R. Wang and D. Y. Huang, Droplet dispersion and ejection process in two-phase boundary layer, AIAA Journal 32 (11), 2217 (1994).

II. Y. Tsuji and Y. Morikawa, LDV measurements of an air-solid two-phase flow in a horizontal pipe, J. Fluid Mech. 120, 385 (1982).

III. Y. Tsuji, Y. Morikawa and H. Shiomi, LDV measurements of an air-solid two-phase flow in a vertical pipe, J. Fluid Mech. 139, 417 (1984).

It can be gathered from the contribution from Wang and Huang that the momentum exchange between a flow and a wall surrounding the flow may be increased provided the flow contains droplets. In this case, it is noteworthy that the droplet density within the boundary layer directed toward the wall surface decreases linearly to the value 0, irrespective of the size of the respective droplets present in the flow. Thus it is also noteworthy that an aerosol having a water/air mixture ratio of about 0.005 causes approximately twice the wall shearing force than is the case with a boundary layer which consists of pure air. Thus the aforesaid contributions from Tsuji and Morikawa also confirm an existing proportionality between the increase in the wall shearing force of a mass flow along a wall and the water/air mass ratio. It is in principle the case that the boundary layer forming along a wall becomes richer in water droplets with an increasing water/air mass ratio within the mass flow flowing through the flow duct.

The momentum transfer to the wall over which a mass flow flows essentially determines the tendency of a two-phase flow to separate into two different phases, at least in the region of the boundary layer.

In particular when a two-phase flow flows through a Laval nozzle, which produces a large pressure gradient within the flow in the direction of flow, a phase separation is undesirable, so that the momentum transfer to the wall has to be designed to be sufficiently small. On the other hand, a very high momentum transfer and, associated therewith, a high wall shearing force contributes to energy losses within the mass flow flowing through the nozzle arrangement, this mass flow considerably reducing the efficiency of the Laval nozzle.

SUMMARY OF THE INVENTION

Accordingly, one object of the invention is to decisively reduce flow losses of a two-phase flow through a flow duct without at the same time sustaining the aforesaid separation effects, which lead to a phase separation in the vicinity of the wall. In particular, the efficiency of a Laval nozzle through which a two-phase mixture passes is to be increased by reducing wall flow losses. The use of such two-phase Laval nozzles serves in particular for the isothermal compression of air, which is preferably fed to a downstream energy-generating unit, for example a gas turbine. The measures according to the invention are therefore also intended to ultimately increase the efficiency of the entire gas-turbine plant.

The achievement of the object of the invention is specified in claim 1. Measures advantageously developing the idea behind the invention are the subject-matter of the subclaims.

The idea underlying the invention borrows the principle with which hydrofoil boats or air-cushion boats, so-called hovercraft, are propelled. The reason for the high speeds which can be achieved by such propulsion means is due to the fact that the area of the hull which is wetted with the denser phase, that is to say water, of the two-phase flow passing through between the hull and the water surface is only small.

According to the invention, a flow duct for the passage of a two-phase flow which has a liquid and a gaseous phase, comprising an inner wall completely enclosing the two-phase flow radially to the direction of flow, is designed in such a way that raised contours are provided on the inner wall of the flow duct, and these raised contours are attached to the inner wall essentially perpendicularly to the direction of flow and are at a distance from one another in the direction of flow.

In their simplest embodiment, the contours raised on the inner wall of the flow duct may be designed as rib features, which in each case enclose an intermediate space, open to the interior of the flow duct, between two directly adjacent rib features. By the provision of such contours on the inner wall of a flow duct or preferably on the inner wall of a Laval nozzle, not the entire surface of the flow-duct inner wall is wetted with the denser phase of the two-phase flow, that is preferably the water, especially as air vortices form in the intermediate spaces of in each case two directly adjacent rib features, and liquid droplets which have entered the intermediate spaces are properly flushed out of the intermediate spaces again by these air vortices. In this way, at least the flow-duct inner wall provided between two rib features is not wetted with the liquid, or only a very small proportion of said flow-duct inner wall is wetted with the liquid.

It should be noted that the provision of the rib features according to the invention inside a flow duct does not constitute a suitable solution to the reduction of flow losses for a single-phase flow, especially as the momentum transfer across the boundary layer from the main flow into the intermediate space between two adjacent rib features is much greater compared with a two-phase flow. On the contrary, pronounced vortices would form in the intermediate spaces in the case of a single-phase flow, and these vortices even contribute to an increased flow loss through the flow duct.

The situation is different in the case of a two-phase flow in which both phases differ greatly in their specific density. In the case of a two-phase flow, the shearing stress occurring due to the air portion inside the intermediate spaces may be largely disregarded, compared with a surface shearing force which would be caused by water on a smoothly formed inner wall of a flow duct. For this reason, it is especially advantageous that, in the case of a two-phase flow through a flow duct, that surface of the flow-duct inner wall which is wetted by the water is reduced as far as possible.

In an especially advantageous embodiment, the contours of rib-like design, at their ends exposed to the two-phase flow, have profiled contact surfaces, which are designed in such a way that the two-phase flow flows over the contact surfaces largely tangentially. By such profiling, in particular the two-phase flow directed in the flow duct is as far as possible directed without large wall friction losses. In addition, with the use of such rib profiling, vortices which rotate uniformly to a very large extent form in the intermediate space of two adjacent rib features, and these vortices contribute to the aforesaid effect of flushing liquid droplets which have passed out of the intermediate spaces into the intermediate spaces.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a shows a detail from a longitudinal sectional representation through a flow duct designed according to the invention, FIG. 1b shows an enlarged longitudinal sectional representation as in FIG. 1a, and FIG. 2 shows a diagram for representing the relationship between the surface portion which is wetted with liquid (epsilon) and the pressure coefficient (lambda) of a tube. In this case, a rib spacing of 5 cm, a water-flow velocity of 100 m/s and a pressure of 98 kPa have been taken as a basis.

DESCRIPTION OF THE PREFERRED EMBODIMENTS

Referring now to the drawings, wherein like reference numerals designate identical or corresponding parts throughout the several views, in FIG. 1 a preferred embodiment is shown in longitudinal sectional representation through a flow duct 2 designed according to the invention. Provided on the inner wall 1 of the flow duct 2 are contours 3, which are raised largely perpendicularly to the inner wall 1 and project into the interior of the flow duct 2. The inner wall 1 is to completely enclose the flow duct 2, preferably in an annular manner, so that the contours 3 likewise run so as to be closed upon themselves and completely enclose a two-phase flow 4 (see flow arrow) provided in the flow duct 2.

In the representation according to FIG. 1a, the two-phase flow 4 flows through the flow duct 2 from top to bottom in accordance with the arrow.

Those ends of the contours 3 which face the flow are designed so as to be shaped uniformly in the direction of flow, so that the contact surface 5 between the two-phase flow and each individual contour 3 can be kept as small as possible. In particular, the two-phase flow 4 sweeps over the profiled contours 3 in each case tangentially to their contact areas 5, so that friction losses can likewise be kept small. Air vortices 7 preferably form in the intermediate spaces 6 of two directly adjacent rib features 3, by means of which air vortices 7 possible liquid particles which have passed into the intermediate spaces 6 are thrown back out of the intermediate spaces into the main two-phase flow 4 again.

A representation of a detail of an inner-wall section with a raised contour 3 attached thereto is depicted in FIG. 1b. On account of the rib features 3, the two-phase flow 4 flows through the flow duct 2 at a distance from the inner wall 1 and comes into contact with the inner wall of the flow duct essentially only via the contact surface 5.

The rib features 3 formed in the manner shown may preferably be additionally covered with a water film 8 on their side facing the two-phase flow, as a result of which the flow losses can be further reduced in the region of the contact surface 5. In particular, a boundary layer 9 forms in the flow plane shown shaded and serves as a shearing or separating layer between the two-phase flow 4 and the intermediate spaces 6.

Tests have shown that the height of the ribs 3 is in each case to be dimensioned to be smaller than their mutual spacing, which is defined by the intermediate spaces 6. Thus, typical distances between two adjacent ribs 3 is around 5 cm.

Tests have shown that the flow losses when a two-phase flow is flowing through a Laval nozzle can be minimized by the contact surface and thus correspondingly the top ends of the rib features being formed in such a way that the two-phase flow comes into contact with the rib pieces over as small a contact area as possible. Measurements have already shown that the provision according to the invention of raised contours on the inner wall of a Laval nozzle, in particular in the inlet region, in which the turbulent boundary layer is very small compared with the radius of the Laval nozzle, is able to reduce the existing pressure losses by an entire order of magnitude. Even in the region of the Laval nozzle in which the two-phase flow spreads out completely in the flow duct, the measures according to the invention can reduce the flow losses by approximately a factor of 2. These results were obtained for two-phase flows with Reynolds numbers at temperatures and pressure conditions which are typical of Laval nozzles, by which air is compressed isothermally in order to be subsequently available for the operation of a gas turbine.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A flow duct for the passage of a two-phase flow which has a liquid and a gaseous phase, comprising:
   an inner wall completely enclosing the two-phase flow radially to the direction of the flow;
   raised contours being provided on the inner wall of the flow duct, said raised contours being attached to the inner wall essentially perpendicularly to the direction of flow and are at a distance from one another in the direction of flow;
   each of said contours having a contact surface which is at a distance from the inner wall of the flow duct and against which the two-phase flow bears; and
   each of said contours, at least in regions of said contact surfaces, having a profile formed in the direction of flow so that the two-phase flow flows over the contact surfaces largely tangentially.

2. The flow duct as claimed in claim 1, wherein the contours are of rib-like design and run on the inner wall of the flow duct so as to be closed upon themselves, so that the contours completely enclose the two-phase flow.

3. The flow duct as claimed in claim 1, wherein the contours run parallel to one another.

4. The flow duct as claimed in claim 1, wherein the contours can be wetted with liquid at least on their side facing the two-phase flow.

5. The flow duct as claimed in claim 1, wherein the height of the contours is less than their mutual spacing.

6. The flow duct as claimed in claim 1, wherein the mutual spacing is about 5 cm.

7. The flow duct as claimed in claim 1, wherein the flow duct is a compressor stage.

8. The flow duct of claim 7, wherein the flow duct is a compressor stage for a gas-turbine plant.

9. The flow duct as claimed in claim 1, wherein the flow duct is a two-phase Laval nozzle.

* * * * *